United States Patent
Mallinson (10) Patent No.: US 11,481,601 B2
(45) Date of Patent: Oct. 25, 2022

(54) ANALOG NEURON WITH S-DOMAIN CHARACTERISTIC

(71) Applicant: SiliconIntervention Inc., Kelowna (CA)

(72) Inventor: A. Martin Mallinson, Kelowna (CA)

(73) Assignee: SiliconIntervention Inc., Kelowna (CA)

( * ) Notice: Subject to any disclaimer, the term of this patent is extended or adjusted under 35 U.S.C. 154(b) by 442 days.

(21) Appl. No.: 16/806,980

(22) Filed: Mar. 2, 2020

(65) Prior Publication Data

US 2020/0279146 A1 Sep. 3, 2020

Related U.S. Application Data

(60) Provisional application No. 62/813,119, filed on Mar. 3, 2019.

(51) Int. Cl.
*G06N 3/04* (2006.01)

(52) U.S. Cl.
CPC ..................... *G06N 3/04* (2013.01)

(58) Field of Classification Search
CPC ...... G06N 3/04; G06N 3/0445; G06N 3/0635; G06N 3/063
See application file for complete search history.

(56) References Cited

U.S. PATENT DOCUMENTS

2018/0121796 A1* 5/2018 Deisher ............... G06N 3/0472

OTHER PUBLICATIONS

"Bilinear transform," Wikipedia, Oct. 8, 2018, ("https://en.wikipedia.org/w/index.php?title=Bilinear_transform&oldid=863053164").
Zheng Tang, O. Ishizuka and H. Matsumoto, "Backpropagation Learning in Analog T-Model Neural Network Hardware," Proceedings of 1993 International Conference on Neural Networks (IJCNN-93-Nagoya, Japan), Nagoya, Japan, 1993, pp. 899-902 vol. 1, doi: 10.1109/IJCNN.1993.714056.
"All-pass filter," Wikipedia, Feb. 15, 2019, ("https://en.wikipedia.org/w/index.php?title=All-pass_filter&oldid=883519110").
"Recurrent neural network," Wikipedia, Feb. 3, 2020, ("https://en.wikipedia.org/w/index.php?title=Recurrent_neural_network&oldid=939038289").
Jeffrey L. Elman, "Finding Structure in Time," Apr.-Jun. 1990, Cognitive Science, vol. 14, Issue 2, pp. 179-211.

* cited by examiner

*Primary Examiner* — Kyoung Lee
(74) *Attorney, Agent, or Firm* — Gard & Kaslow LLP (57) ABSTRACT

An analog element for use as a neuron in a recurrent neural network is described, the analog element having memory of a prior layer state and being a continuous time circuit rather than having a discrete clocking interval. The element is characterized and described by the Laplace s-domain operator, as distinct from a digital solution that uses the z-domain operator appropriate for quantized time descriptions. Rather than using an all-pass filter, the analog equivalent of a unit delay in the z-domain, a finite gain integrator, which is a simpler circuit, may be used to provide the delay in the analog s-domain. The resulting circuit may be easily implemented at the transistor level.

5 Claims, 6 Drawing Sheets

ANALOG NEURON WITH S-DOMAIN CHARACTERISTIC

This application claims priority from Provisional Application No. 62/813,119, filed Mar. 3, 2019, which is incorporated by reference herein in its entirety.

FIELD OF THE INVENTION

The present invention relates generally to artificial intelligence (AI) networks, and more particularly to neurons in such AI networks with memory of the previous state.

BACKGROUND OF THE INVENTION

Figure 1:
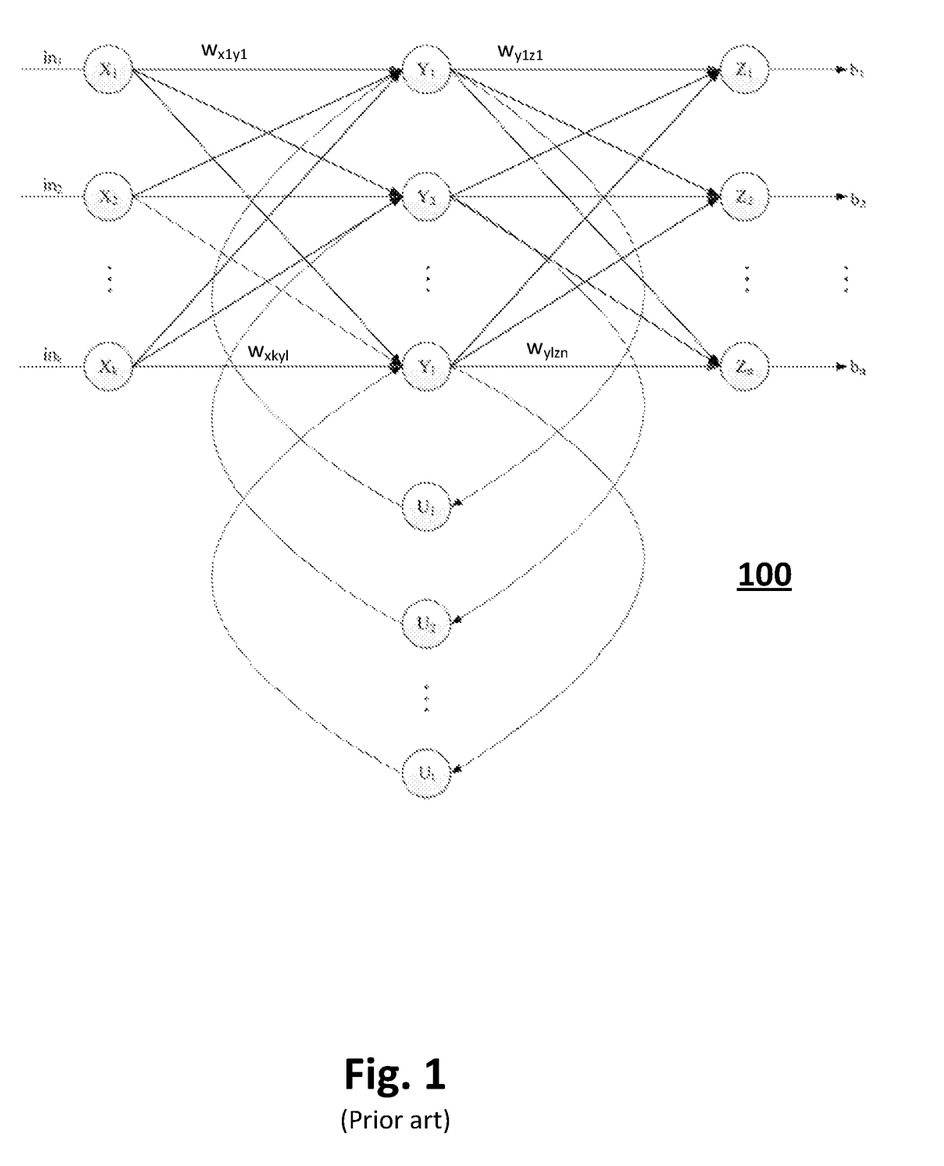
FIG. 1 is a diagram of an implementation of a canonical Elman AI network as is known in the prior art.

FIG. 1 shows an implementation of one type of AI network, a canonical Elman recurrent neural network (RNN) as is known in the prior art. As will be known to one of skill in the art, in some implementations of a RNN, such as an Elman or Jordan network, the state of a hidden layer h depends upon the previous state of the hidden layer, i.e., it has memory of its last value.

In network 100 of FIG. 1, for example, it may be seen that neuron $Y_1$ receives, in addition to the current inputs from neurons $X_1$ to $X_L$, an input from neuron $U_1$ that is dependent on the prior state of neuron $Y_1$. As seen in FIG. 1, each of neurons $Y_2$ to $Y_L$ also receives input about its own prior state from neurons $U_2$ to $U_L$ respectively. The equations describing the network introduce such prior state variables by z-domain operations on the current state, using a discrete delay operator $z^{-1}$.

However, it is often desirable to implement an AI network in an analog computer, rather than a digital one. There are commercial reasons for this, as analog circuits are often capable of higher speed and lower power consumption than their digital equivalents.

Thus, it can be beneficial to construct a neural network in the analog domain as a continuous time system, not having a digital clocking interval. To accomplish this, an analog neuron providing feedback around the hidden middle layer that is the last state of that hidden layer is desirable.

SUMMARY OF THE INVENTION

The present application describes a continuous time analog element for use as a neuron in a neural network, the element having memory of a prior layer state and not having a discrete clocking interval.

One embodiment describes a circuit for use as a neuron in a neural network, comprising: a plurality of resistors configured to receive a threshold signal and elements of an input signal; a buffer configured to receive a sum of the elements of the input signal as weighted by the plurality of resistors and produce the weighted sum as an output; an all-pass filter configured to receive the output of the buffer and to produce a delayed copy of the output of the buffer.

Another embodiment describes a circuit for use as a neuron in a neural network, comprising: a plurality of resistors configured to receive a threshold signal and elements of an input signal; a buffer configured to receive a sum of the elements of the input signal as weighted by the plurality of resistors and produce the weighted sum as an output; a finite gain integrator configured to receive the output of the buffer and to produce a delayed copy of the output of the buffer.

Still another embodiment describes a method of operating an analog element as a neuron in a recurrent neural network, the analog element being a continuous time circuit rather than having a discrete clocking interval, comprising: receiving in the analog element a plurality of weighted input signals; summing the weighted input signals; and passing the sum of the weighted input signals through an analog delay element to produce a delayed sum.

Yet another embodiment describes a circuit for use as a neuron in a neural network, comprising: a plurality of resistors configured to receive a threshold signal and elements of an input signal and providing an overall weighted input signal; a current source having a first end connected to a ground and a second end; a plurality of transistors, each transistor having a gate, a source and a drain; a first one of the plurality of transistors having its source connected to the power supply and its gate and drain connected to the second end of the current source; a second one of the plurality of transistors having its source connected to the power supply and its gate connected to the gate of the first transistor; a third one of the plurality of transistors having its gate connected to the plurality of resistors and its drain connected to the drain of the second transistor; a fourth one of the plurality of transistors having its gate connected to the source of the third transistor and its source connected to the drain of the second transistor; a fifth one of the plurality of transistors having its drain connected to the source of the third transistor and its source connected to the ground; a sixth one of the plurality of transistors having its gate and its drain connected to the ground, and its source connected to the drain of the fourth transistor; a capacitor having a first end and a second end, the first end connected to the drain of the fourth transistor, the gate of the fifth transistor, and the source of the sixth transistor; a resistor having a first end and a second end, the first end connected to the drain of the third transistor and the source of the fourth transistor, and the second end connected to a common voltage; and an output port connected to the source of the fourth transistor and providing as an output a copy of the overall weighted input signal.

DETAILED DESCRIPTION OF THE INVENTION

The present application describes an analog element for use as a neuron in a RNN, the analog element having memory of a prior layer state and being a continuous time circuit rather than having a discrete clocking interval. The element is characterized and described by the Laplace s-domain operator, as distinct from a digital solution that uses the z-domain operator appropriate for quantized time descriptions.

Rather than using an all-pass filter, the analog equivalent of a unit delay in the z-domain, a finite gain integrator, which is a simpler circuit, may be used to provide the delay in the analog s-domain. The resulting circuit may be easily implemented at the transistor level.

A bilinear transform (also known as Tustin's method) may be used to transform a discrete-time system representation (i.e., digital z-domain) to a continuous-time representation (analog s-domain) and vice versa. The bilinear transform relates the Laplace derivative s to the discrete delay operator $z^{-1}$ as approximately:

$$Z^{-1} = \frac{1 + sT/2}{1 - sT/2} \quad \text{(Equation 1)}$$

where T is the operating rate in the z-domain, i.e., the rate at which the digital system can update the array quantities given by the Elman equations.

Figure 2:
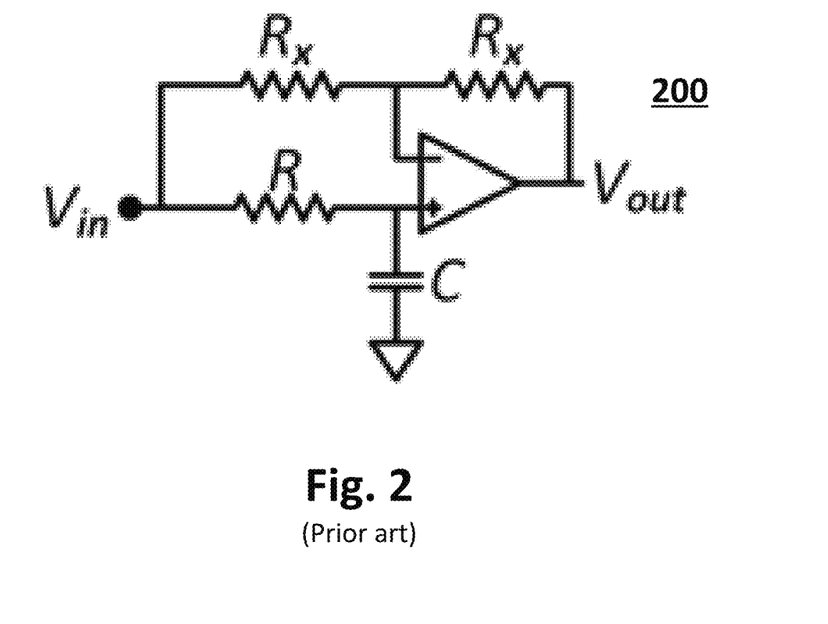
FIG. 2 is a diagram of an all-pass filter according to the prior art.

FIG. 2 shows an analog processing circuit known as an all-pass filter, which is a signal processing filter that passes all frequencies equally in gain, but changes the phase relationship among various frequencies. It has the s-domain expression of:

$$\frac{1 - sRC}{1 + sRC} \quad \text{(Equation 2)}$$

Comparing Equation 2 to Equation 1 above, it will be seen that $$z^{-1} = \frac{1 - sRC}{1 + sRC}$$

if RC=T/2. (The R here is the R in FIG. 2, i.e., the resistor connected to the non-inverting input of the amplifier, not the feedback resistor Rx.)

Figure 3:
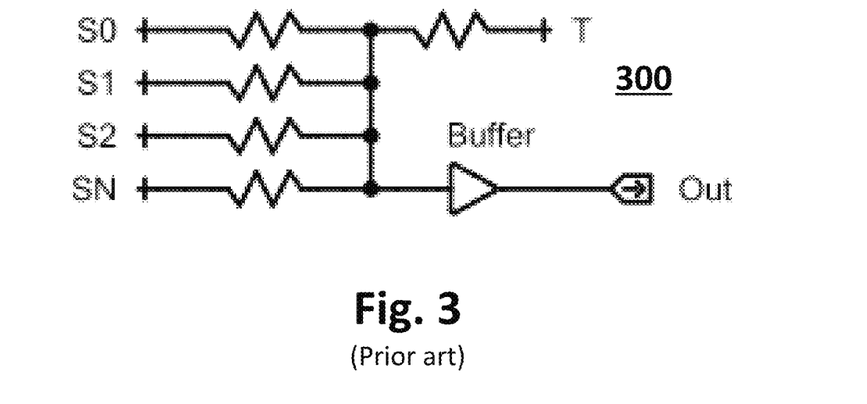
FIG. 3 is a diagram of an analog circuit that may be used as a neuron in layers of an AI network that do not have feedback of a prior state according to one embodiment.

FIG. 3 is a diagram of an analog circuit 300 that may be used as a neuron in the X and Z layers of network 100 of FIG. 1, i.e., the layers that do not have feedback of a prior state. A circuit such as circuit 300 may be used, for example, as a T-model analog neuron in a T-model network; the T-model network is known to those of skill in the art.

The inputs S0 to SN in circuit 300 in FIG. 3 each have a different weight that depends upon the potentially different values of the resistors to which the inputs are applied. The input T represents a threshold value, and the Buffer is assumed to include some form of activation function.

A unit delay is not the only element that can be used as a means of introducing the aspect of time into a digital implementation of a network, but it is probably the simplest. The s-domain element that most closely resembles the unit delay in the z-domain is the all-pass filter. Thus, one way to modify the analog neuron circuit 300 of FIG. 3 is to add an all-pass filter.

Figure 4:
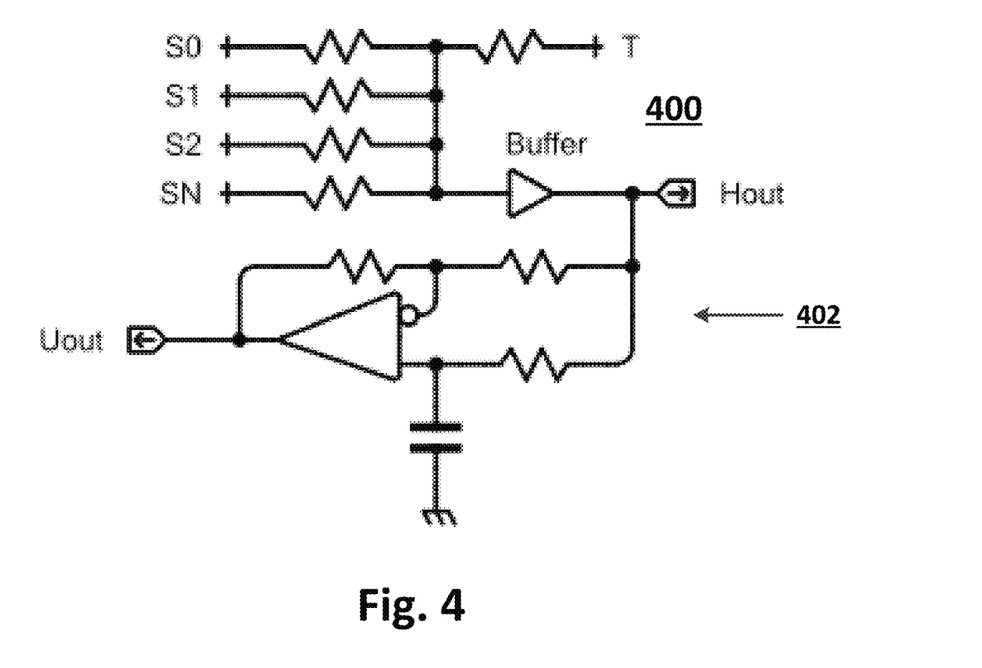
FIG. 4 is a diagram of an analog circuit that may be used as a neuron in layers of an AI network that use feedback of a prior state according to one embodiment.

FIG. 4 is a diagram of an analog circuit 400 in which an all-pass filter 402 is added to the circuit 300 of FIG. 3. The all-pass filter 402 delays the output Hout and results in a delayed output Uout. The delayed output Uout may then be added back to the neuron of circuit 400 for the neuron's next operation.

Circuit 400 may thus be used as a neuron in layers of an AI network that provide feedback of a prior state, such as the neurons $U_1$ to $U_L$ of network 100 in FIG. 1, according to the present approach. As above, a discrete delay is replaced with a continuous function approximating the delay, i.e., replacing the z-domain delay operator with an equivalent s-domain operator.

However, while the unit delay may be the simplest element for accomplishing the desired delay in the digital domain, it is not the simplest element for doing so in the analog domain. Thus, the all-pass filter 402 of circuit 400 is not necessary. All that is needed is a circuit that preserves the prior state of the output signal Hout with a delay to obtain a delayed state signal Uout.

Figure 5:
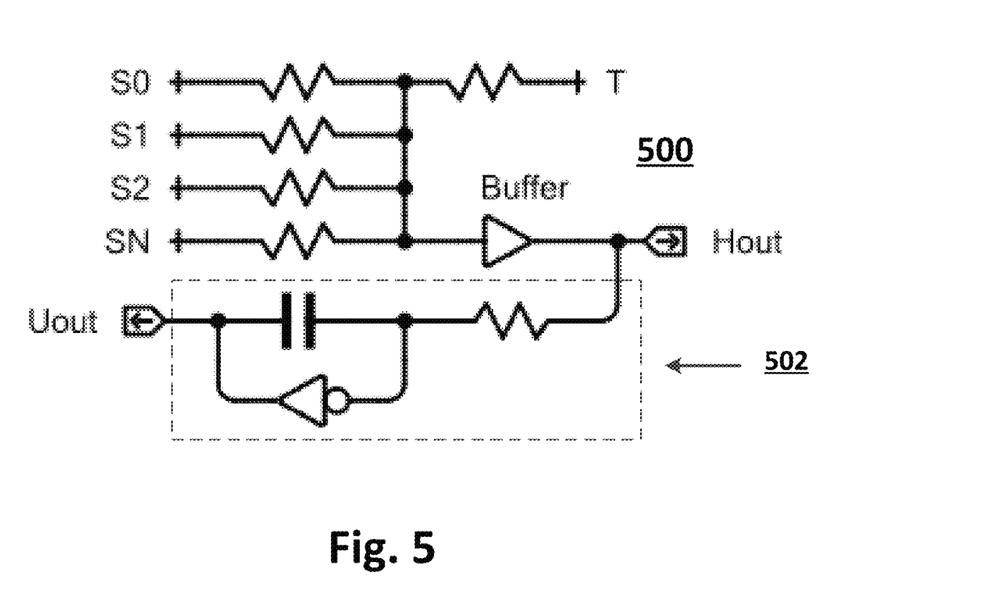
FIG. 5 is a diagram of an analog circuit that may be used as a neuron in layers of an AI network that use feedback of a prior state according to another embodiment.

FIG. 5 shows a simpler analog circuit 500 that may be used as a neuron in layers of an AI network that use feedback of a prior state. As with circuit 400 of FIG. 4, circuit 500 allows the network to find structure in time with less complexity. Instead of the all-pass filter 402 of FIG. 400, in circuit 500 this is accomplished with a finite gain integrator 502 that also delays the output signal Hout, and requires only a capacitor, a resistor and an inverter as illustrated. While the finite gain integrator 502 has no equivalent in the digital domain, it nonetheless provides the same unit delay as the all-pass filter 402 of FIG. 4.

Figure 6:
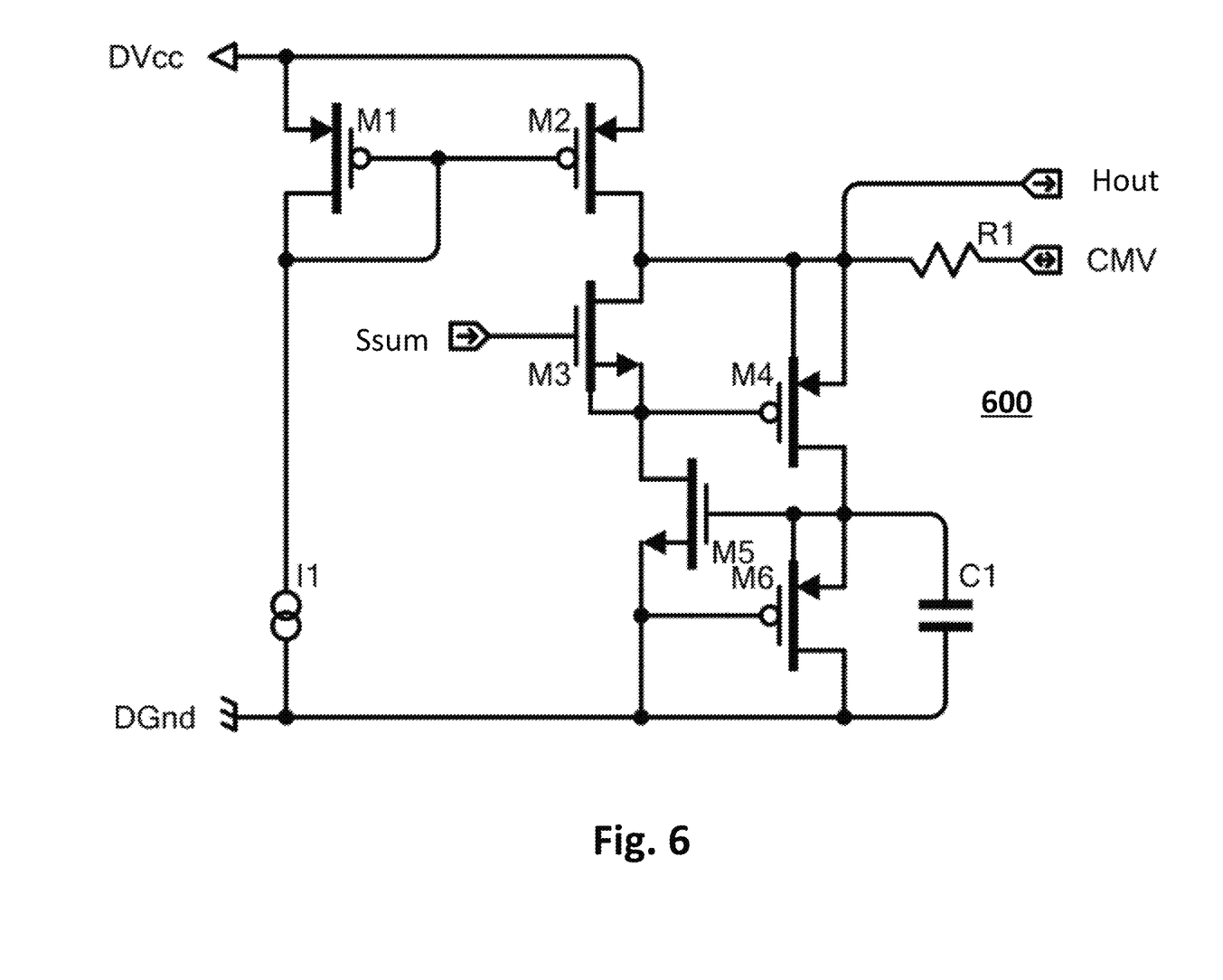
FIG. 6 is a circuit diagram of a circuit that is one way in which a portion of the circuit of FIG. 5 might be implemented at the transistor level according to one embodiment.

FIG. 6 is a circuit diagram of a circuit 600 that is one way in which the finite gain integrator 502 of FIG. 5 might be implemented at the transistor level. The buffer of circuit 500 is also included in circuit 600; thus, there must be two outputs available, both the current state and the prior state.

In circuit 600, a signal Ssum, which is the weighted sum of the inputs S0 to SN in circuit 500, is applied to the gate of transistor M3. N-type metal-oxide semiconductor ("NMOS") transistor M3 is an NMOS follower, so it creates a DC shifted copy of the signal Ssum on the gate of p-type metal-oxide-semiconductor ("PMOS") transistor M4. Transistor M4 is a PMOS follower, so it in turn creates a DC shifted copy of the input voltage at the terminal Hout. Transistors M3 and M4 are equivalent to the buffer in circuit 500 of FIG. 5, and the output Hout is thus the current state signal, just as Hout is the current state signal in FIG. 5.

Both transistors M3 and M4 make DC shifts to the signal they receive. However, the voltage difference between the input Ssum and the output Hout is nominally zero due to the modified mirror arrangement of transistors M5 and M6. The output current (into the next layer of neurons) must flow through transistors M4 and M3 because the current provided from transistor M2 is nominally constant. Transistors M6 and M5 nevertheless adjust to ensure the voltage difference between input and output remains zero.

PMOS transistor M6 has a source-gate voltage equal to that of transistor M4; the fact that transistor M6 is PMOS rather than NMOS compensates for the difference in transistors M3 and M4 by biasing transistor M5 such that it forces the source-gate voltage of transistor M3. Consequently, the source followers cancel out and there is nominally no voltage difference between the input and the output.

The present approach is conveniently made applicable to a RNN, such as the Elman configuration, (in which the delayed hidden layer output is input into the same hidden layer neuron as above) by simply adding capacitor C1. Capacitor C1 provides a voltage to the gate of transistor M5 that is equal to the prior state value, and also delays the current change in transistor M3. This introduces an offset proportional to the old value of the output.

Figure 7:
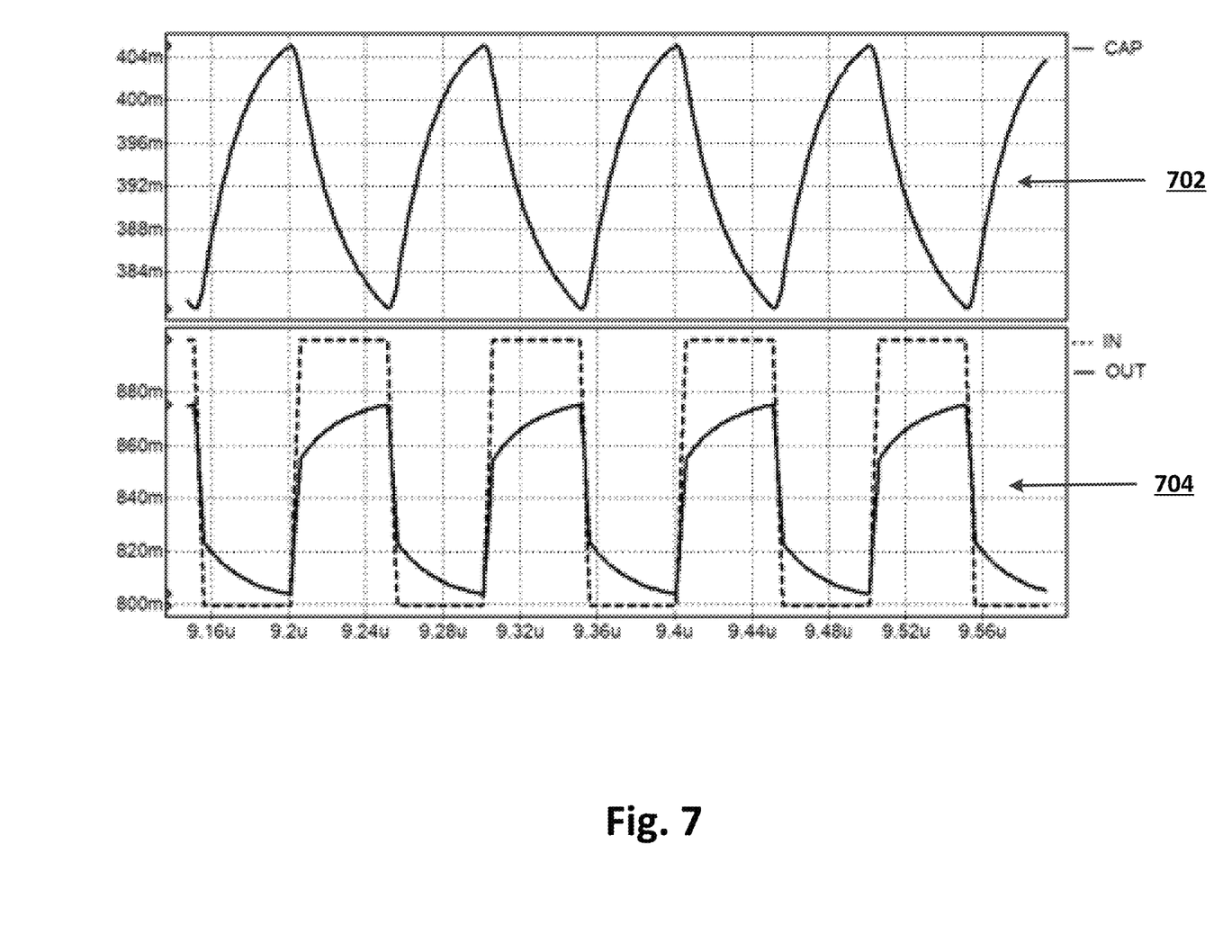
FIG. 7 shows graphs of signals in the circuit of FIG. 6.

FIG. 7 shows graphs of signals in the circuit 600 of FIG. 6. Curve 702 shows the signal on the capacitor C1 in circuit 600 of FIG. 6. The signal on the capacitor is the source of the memory in circuit 600, i.e., it "remembers" the prior state and suppresses the output for a time due to the prior state, as seen in curve 704. This memory is what is necessary to make a RNN.

Figure 8:
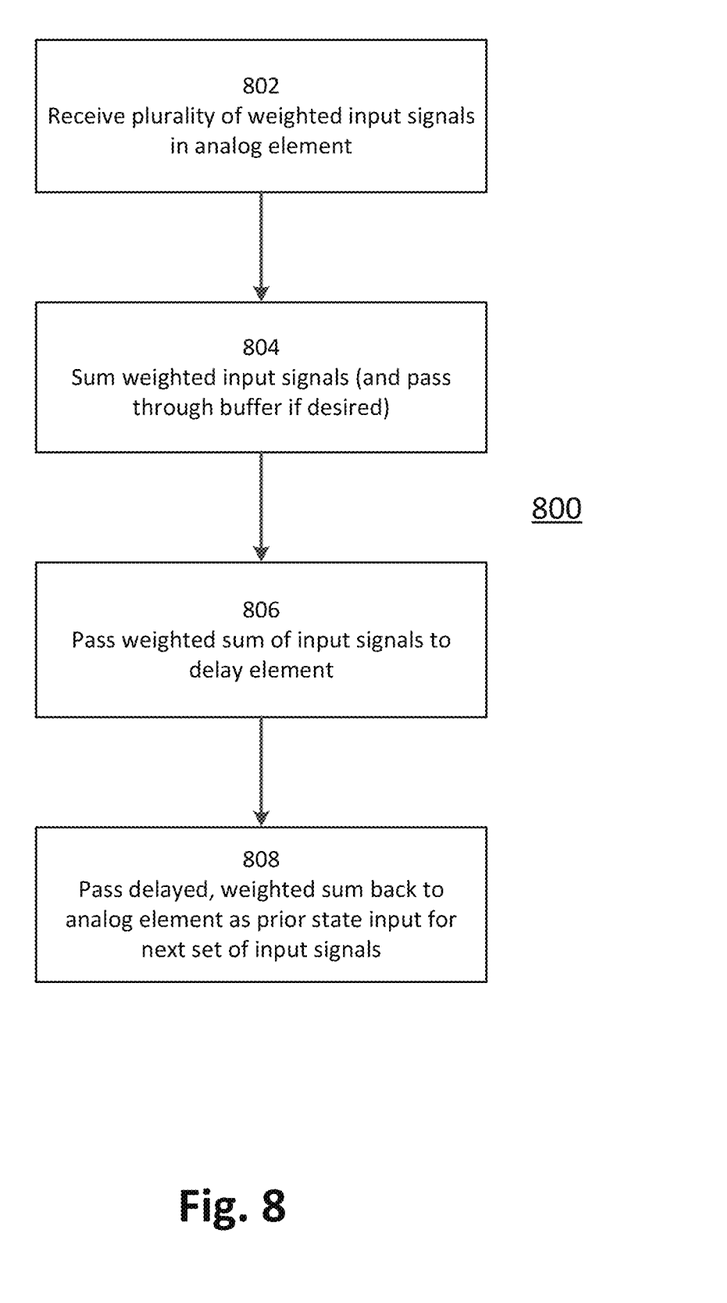
FIG. 8 is a flowchart of a method of operating an analog element as a neuron in a recurrent neural network according to the present approach

FIG. 8 is a flowchart of a method 800 of operating an analog element as a neuron in a recurrent neural network, the analog element being a continuous time circuit rather than having a discrete clocking interval, according to the present approach.

At step 802, the analog element, such as circuit 400 of FIG. 4, circuit 500 of FIG. 5 or circuit 600 of FIG. 6, receives a plurality of weighted input signals. At step 804, the weighted input signals are summed; this may be as simple as having all of the resistors carrying the input signals attached to the buffer, as shown in circuit 400 or circuit 500, or to transistor M3 in circuit 600 (which is part of the buffer in that embodiment). The weighted sum is passed through the buffer if this is desired, as shown in circuits 400, 500 and 600.

At step 806, the sum of the weighted input signals is passed through a delay element and produces a weighted sum. This concludes one cycle of operation of the analog element. As the RNN proceeds to a new set of input signals, at step 808, the output of the analog element, i.e., the delayed, weighted sum, is passed back to the analog element as a prior state input for the weighting of the next set of input signals.

By combining these features, it is possible to construct an analog element operating in continuous time and lacking a discrete clocking interval but still having memory of the layer state with a reduced number of components. One of skill in the art in light of the teachings herein will appreciate that a RNN may be constructed according to these principles.

It should be noted that the use of the Elman network is an example only; any recurrent network can be transformed by the bilinear transform into a continuous time equivalent. Further, it is not necessary that the delay in the Recurrent Network be a pure delay; for example, the s-domain operation $$\mathcal{P}(s) = \frac{1}{s+a}$$

which is a finite gain integrator or single pole response, will create an Elman-like recurrent network.

The disclosed system has been explained above with reference to several embodiments. Other embodiments will be apparent to those skilled in the art in light of this disclosure. Certain aspects of the described method and apparatus may readily be implemented using configurations other than those described in the embodiments above, or in conjunction with elements other than or in addition to those described above.

For example, as is well understood by those of skill in the art, various choices will be apparent to those of skill in the art. Further, the illustration of transistors and the associated feedback loops, resistors, etc., is exemplary; one of skill in the art will be able to select the appropriate number of transistors and related elements that is appropriate for a particular application.

These and other variations upon the embodiments are intended to be covered by the present disclosure, which is limited only by the appended claims.

What is claimed is:

1. A circuit for use as a neuron in a neural network, comprising:
   a plurality of resistors configured to receive a threshold signal and elements of an input signal;
   a buffer configured to receive a sum of the elements of the input signal as weighted by the plurality of resistors and produce the weighted sum as an output;
   an all-pass filter configured to receive the output of the buffer and to produce a delayed copy of the output of the buffer.

2. A circuit for use as a neuron in a neural network, comprising:
   a plurality of resistors configured to receive a threshold signal and elements of an input signal;
   a buffer configured to receive a sum of the elements of the input signal as weighted by the plurality of resistors and produce the weighted sum as an output;
   a finite gain integrator configured to receive the output of the buffer and to produce a delayed copy of the output of the buffer.

3. The circuit of claim 2, wherein the finite gain integrator further comprises:
   a resistor having first and second ends, a first end connected to the output of the buffer;
   a capacitor having first and second ends, a first end of the capacitor connected to the second end of the resistor; and
   an inverter having an input end and an output end, the input end of the inverter connected to the second end of the resistor and the first end of the capacitor, and the output end of the inverter connected to the second end of the capacitor.

4. A circuit configured as a neuron in a neural network, comprising:
   a plurality of resistors configured to receive a threshold signal and elements of an input signal and providing an overall weighted input signal;
   a current source having a first end connected to a ground and a second end;
   a plurality of transistors, each transistor having a gate, a source and a drain;
      a first one of the plurality of transistors having its source connected to the power supply and its gate and drain connected to the second end of the current source;
      a second one of the plurality of transistors having its source connected to the power supply and its gate connected to the gate of the first transistor;
      a third one of the plurality of transistors having its gate connected to the plurality of resistors and its drain connected to the drain of the second transistor;
      a fourth one of the plurality of transistors having its gate connected to the source of the third transistor and its source connected to the drain of the second transistor;
      a fifth one of the plurality of transistors having its drain connected to the source of the third transistor and its source connected to the ground;

a sixth one of the plurality of transistors having its gate and its drain connected to the ground, and its source connected to the drain of the fourth transistor;

a capacitor having a first end and a second end, the first end connected to the drain of the fourth transistor, the gate of the fifth transistor, and the source of the sixth transistor;

a resistor having a first end and a second end, the first end connected to the drain of the third transistor and the source of the fourth transistor, and the second end connected to a common voltage; and an output port connected to the source of the fourth transistor and providing as an output a copy of the overall weighted input signal.

5. The circuit of claim 4 wherein the first, second, fourth and sixth transistors are p-type metal oxide semiconductor transistors, and the third and fifth transistors are n-type metal oxide semiconductor transistors.

\* \* \* \* \*